United States Patent
Kim et al.

(10) Patent No.: US 7,664,732 B2
(45) Date of Patent: Feb. 16, 2010

(54) METHOD OF MANAGING WEBSITES REGISTERED IN SEARCH ENGINE AND A SYSTEM THEREOF

(75) Inventors: Young Kwan Kim, Anyang-si (KR); Sang Yong Bae, Anyang-si (KR)

(73) Assignee: NHN Corporation, Seoul (KR)

( * ) Notice: Subject to any disclaimer, the term of this patent is extended or adjusted under 35 U.S.C. 154(b) by 403 days.

(21) Appl. No.: 10/555,520

(22) PCT Filed: May 31, 2004

(86) PCT No.: PCT/KR2004/001291

§ 371 (c)(1),
(2), (4) Date: Nov. 3, 2005

(87) PCT Pub. No.: WO2004/107213

PCT Pub. Date: Dec. 9, 2004

(65) Prior Publication Data

US 2007/0055642 A1    Mar. 8, 2007

(30) Foreign Application Priority Data

May 31, 2003  (KR)  .................. 10-2003-0035044
May 28, 2004  (KR)  .................. 10-2004-0038426

(51) Int. Cl.
*G06F 7/00* (2006.01)
*G06F 17/30* (2006.01)

(52) U.S. Cl. .......................................................... 707/3

(58) Field of Classification Search ........................ None
See application file for complete search history.

(56) References Cited

U.S. PATENT DOCUMENTS 6,615,242 B1 * 9/2003 Riemers ...................... 709/206

(Continued)

FOREIGN PATENT DOCUMENTS

JP           2000-235540         8/2000

(Continued)

OTHER PUBLICATIONS

"Automatically obtaining a large amount of files using technique", PC Japan magazine, Softbank Publishing, Jun. 1, 2003, pp. 62-79.

(Continued)

*Primary Examiner*—James Trujillo
*Assistant Examiner*—Nicholas E Allen
(74) *Attorney, Agent, or Firm*—H. C. Park & Associates, PLC

(57) ABSTRACT

The present invention relates to a search engine that provides information on a predetermined website on the Internet. According to a preferred embodiment of the present invention, there is provided a method of managing websites registered in a search engine in a search engine administration system, comprising the steps of allowing a predetermined interface module to receive information on a website and allowing a website registration module to sort the received website information by the predetermined field and then to record the sorted information in a database means; extracting a HTML file constituting web pages of the website; detecting a predetermined function that generates a pop-up window by analyzing the extracted HTML file; increasing a predetermined counter value as much as a given value depending on the number of pop-up windows generated due to the detected function; determining whether the counter value exceeds a predetermined value; and if it is determined that the counter value exceeds the predetermined value, controlling a predetermined process to be performed for the registered website.

14 Claims, 11 Drawing Sheets

U.S. PATENT DOCUMENTS

| | | | |
|---|---|---|---|
| 7,051,285 B1* | 5/2006 | Harrison et al. | 715/760 |
| 2001/0025245 A1* | 9/2001 | Flickinger et al. | 705/1 |
| 2001/0044800 A1* | 11/2001 | Han | 707/104.1 |
| 2002/0129013 A1* | 9/2002 | Thomas | 707/3 |
| 2003/0212649 A1* | 11/2003 | Denesuk et al. | 707/1 |
| 2004/0125149 A1* | 7/2004 | Lapidous | 345/808 |

FOREIGN PATENT DOCUMENTS

| | | |
|---|---|---|
| KR | 2001 105960 | 11/2001 |
| KR | 2001 106666 | 12/2001 |
| KR | 2002 075027 | 6/2002 |
| WO | 01/82026 | 11/2001 |

OTHER PUBLICATIONS

Baba Tomomiz, et al; "Internet and WWW Technology (III) WWW Server Technology", A Journal of the video electronic society 1997, vol. 26, No. 3, Jun. 26, 1997, pp. 275-284.

"Warning and exposing an infringement of copyright of JASRAC music in internet", Nikkei Personal Computing, Mar. 31, 2003, p. 28.

* cited by examiner

FIG. 4a

```
<SCRIPT LANGUAGE="JavaScript">
<!--Begin
Function leave() {
Window.open('http://www.yourserver.com/page-to-
open.html','toolbar=no,menubar=no,location=no,height=5
00, width=500');
}
//End-->
</SCRIPT>

<BODY onUnload="leave()">
```

FIG. 4b

```
//head Insert in Tag
<script language="JavaScript">
<!--Begin
Function TripodShowPopup(){
//open the popup window
Car popupURL=http://jhklmg.hihome.com/; var
popup=window.open(popupURL, "TripodPopup", 'toolbar=0,
location=0, directories=0, status=0, menubar=0, scrollbars=0,
resizable=0, width=400, height=150');
//set the opener if It's not already set. It's set automatically
//in netscape 3.0+ and Ie 3.0+
If(navigator.appName.substring(0.8)=="Netscape"){popup.location
=popupURL;}
}
TripodShowPopup();
//End-->
</script>
```

FIG. 6a spam1.html

```
<meta http-equiv="refresh" content="0;
url=http://www.sexhouse.com">
``` spam2.html

```
<script>
self.location="http://www.sexhouse.com
";
</script>
``` spam3.html

```
<script>
location.replace("http://www.sexhouse.co
m");
</script>
```

FIG. 6b

```
<html>
<head>
<META http-equiv="PICS-label" content='(PICS-
1.1 "http://www.sexhouse.com/rating.html" l gen true
for "http://www.porno.com" r (y 1))'>
<META http-equiv="PICS-label" content='(PICS-
1.1 "www.hardcore.com/rating.html" l gen true for "http://www.pussy.com" r (n
3 s 3 v 3 l 3 l 0 h 1))'>

<script language="JavaScript">
<!--
        self.moveTo(0,0);
        self.resizeTo(screen.availWidth,screen.availHeight);
        self.focus();
// -->
</script>

</head>
</html>
```

METHOD OF MANAGING WEBSITES REGISTERED IN SEARCH ENGINE AND A SYSTEM THEREOF

TECHNICAL FIELD

The present invention relates to a search engine that provides information on a predetermined website on the Internet. More particularly, the present invention relates to a method of managing registered websites, wherein information on predetermined websites registered in a search engine is analyzed and thus predetermined spam or adult sites are tracked whereby unnecessary information is not provided to a search engine user.

BACKGROUND ART

A typical search engine such as Altavista (http://www.altavista.com), Lycos (http://www.lycos.com) and Yahoo (http://www.yahoo.com) includes a database for classifying, storing and managing common website information according to a predetermined reference, a search robot implemented using software that mechanically collects new website information while consistently traveling the web, and search engine software for collating the collected data into a database so that a user who uses the search engine can search the data.

A block diagram of the system for providing the aforementioned search engine service is illustrated in FIG. 1. Referring to FIG. 1, a user accesses a search engine server 150 through a user terminal 110 over the Internet. If the user inputs a predetermined search word, the search engine server 150 queries website information on the search word using search engine software 140. The search engine software 140 searches a relevant database 130 and informs the search engine server 150 of the predetermined website information. A search robot 120 is an entity that is implemented using software for mechanically collecting new website information from a web server 160 while consistently circulating on the web, as described above. The search robot 120 searches sentences written in HTML (HyperText Markup Language) on the network and parses the link source in which the sentences are written to collect data from a plurality of websites existing on the network.

The data collected by the search robot 120 as such are collated into a database. In this case, databasing refers to a series of sequences wherein a morphological analysis of predetermined information located in a website is performed, an index table is written and then recorded in the database 130. The database 130 records all website information collected by the search robot 120. The search engine software 140 shows search results to a user. This software operates to search numerous pages recorded in the database 130 and provide a list of websites containing character strings consistent with a search word according to an arrangement order determined based on a specific algorithm to a search service user. Such a prior search engine registers information on the website in the search engine and provides the information to the user in the following manner.

(1) As described above, predetermined information is collected by the search robot and the collected information on the website is registered in the search engine through the supervision of an expert surfer.

(2) A directory sorted according to website titles to be registered is selected and a request is made for registration of the website in the selected directory. The website is then registered in the search engine through the supervision of an expert surfer. In case of such registration in the directory, a service for reducing the time required for registration of a website upon payment of a predetermined registration fee is provided depending on the search engine.

A user who wants to search predetermined information inputs a search word and the website registered in the search engine through the above method, etc. is searched in various search modes such as an integrated web search or a directory search and is then provided to the user. The integrated web search is also referred to as a "search by keyword". This search method refers to a method in which URLs (universal resource locator) of all websites are recorded in a database and desired information is searched through the input of a specific keyword.

The prior method of providing the search service of the website has the following problems.

(1) There may be a case where content included in a website when it is first registered in a search engine is different from that included in the website after being registered in the search engine. For example, there is a problem that although a website contains predetermined content when it is first registered in the search engine, the website may gradually deteriorate as time goes by and thus become a spam site that generates a number of pop-up windows. Such spam sites that generate a number of these pop-up windows usually contain adult content. If a user visits a corresponding URL of the spam site or exits the URL, the spam site generates several to several dozen pop-up windows at the same time. Thus, it causes lots of inconvenience to the user.

(2) Furthermore, most search engine companies request different registration fees for a common website for a common keyword and for an adult website for a keyword related to adult content. This is because the search engine companies bear the burden regarding registration management of such adult websites since there is a high possibility that the adult website will violate the positive law compared to common websites. By making ill use of this fact, a user may register his website that contains common content using a common keyword in a search engine and then modify the HTML source of the original website, which directly provides adult content or is linked to other sites that provide adult content. This site may be defined as a "deteriorated site". There is a problem in that such deteriorated sites are very difficult to detect without a report from search engine users or intentional search by an expert surfer, etc.

As an alternative for solving the aforementioned problems, registered websites are consistently monitored through reports from users or expert personnel such as an expert surfer. It is, however, evident that this prior method could not be a fundamental solution for the aforementioned problems. Therefore, there is a need for a method wherein those problems are automatically solved through a predetermined algorithm on the Internet.

DISCLOSURE OF INVENTION

A method for managing websites registered in a search engine according to the present invention is conceived to solve the aforementioned problems in the prior art. An object of the present invention is to provide a search engine service wherein spam sites or deteriorated sites that generate a number of pop-up windows are automatically detected through a predetermined algorithm, thus not causing inconvenience of a search engine user.

Another object of the present invention is to provide a method for managing websites registered in a search engine wherein spam sites or deteriorated sites are automatically detected and sanctions are applied against an operator of the detected spam or deteriorated site, thereby enhancing self-purification of the websites registered in the search engine.

A further object of the present invention is to provide a method for managing websites registered in a search engine wherein spam sites or deteriorated sites are detected and sanctions such as warnings are automatically applied against the detected spam sites or deteriorated sites through a predetermined algorithm, thus saving human resources that can be used to detect those websites.

According to a preferred embodiment of the present invention, there is provided a method of managing websites registered in a search engine in a search engine administration system, comprising the steps of allowing a predetermined interface module to receive information on a website and allowing a website registration module to sort the received website information by the predetermined field and then to record the sorted information in a database means; extracting a HTML file constituting web pages of the website; detecting a predetermined function that generates a pop-up window by analyzing the extracted HTML file; increasing a predetermined counter value as much as a given value depending on the number of pop-up windows generated due to the detected function; determining whether the counter value exceeds a predetermined value; and if it is determined that the counter value exceeds the predetermined value, controlling a predetermined process to be performed for the registered website.

Furthermore, according to another preferred embodiment of the present invention, there is provided a method of managing websites registered in a search engine in a search engine administration system, comprising the steps of allowing a predetermined interface module to receive information on a website and allowing a website registration module to sort the received website information by the predetermined field and then to record the sorted information in a database means; extracting a HTML file of a first page which is the highest page among web pages of the website; determining whether the first page is a spam page by analyzing the HTML file extracted from the first page; and if it is determined that the first page is a spam page, controlling a predetermined process to be performed for the registered website. The step of determining whether the first page is a spam page comprises the steps of to detecting a predetermined function that generates a pop-up window by analyzing the extracted HTML file; increasing a predetermined counter value as much as a given value depending on the number of pop-up windows generated due to the detected function; determining whether the counter value exceeds a predetermined value; and if it is determined that the counter value exceeds the predetermined value, determining the first page as a spam page.

In the present invention, a spam site refers to a website for inserting a predetermined function, etc. into a HTML file, etc. of a web page by means of various methods and generating a given number of pop-up windows when a user visits a corresponding URL or exits the corresponding URL. Moreover, a web page that is determined to be spam in accordance with a reference for determining a spam site according to the present invention among one or more web pages constituting a website is named a spam page.

In addition, in the present invention, a deteriorated site refers to a website in which content provided through a predetermined web page is adult content. That is, the website refers to a website that is not registered as an adult site upon registration but has deteriorated and has become an adult site after registration. Additionally, an adult site refers to a website containing content that is detrimental to the younger generation and juveniles.

BRIEF DESCRIPTION OF DRAWINGS

FIGS. 4a and 4b show exemplary HTML files of spam sites which are extracted by a search robot that travels websites in the method of managing the website registered in the search engine according to a preferred embodiment of the present invention.

FIGS. 6a and 6b show exemplary HTML files of adult sites which are extracted by a search robot that travels websites in the method of managing the website registered in the search engine according to a preferred embodiment of the present invention.

BEST MODE FOR CARRYING OUT THE INVENTION

Hereinafter, a method of managing registration of a website in a search engine and a system thereof according to preferred embodiments of the present invention will be described in detail with reference to the accompanying drawings.

Figure 1:
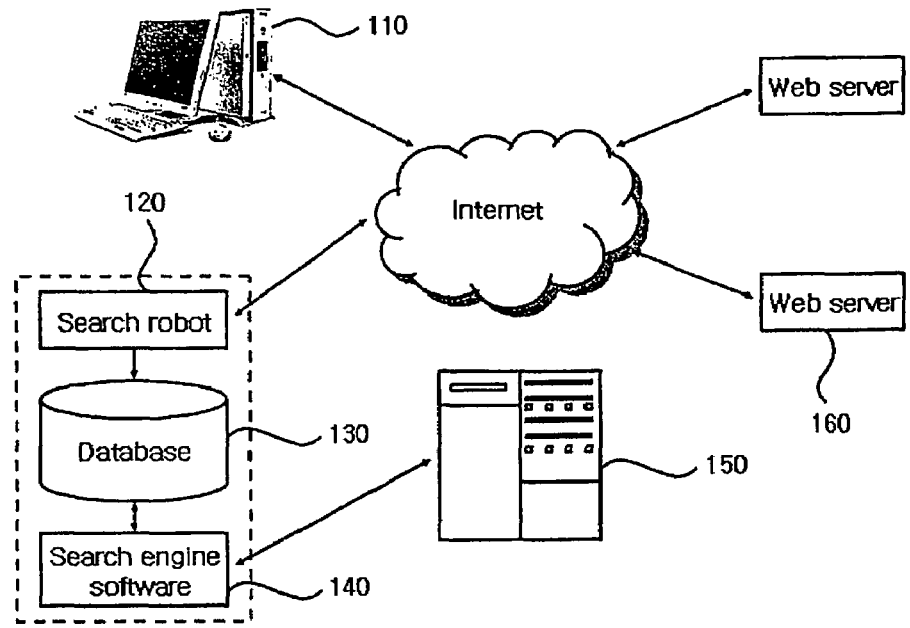
FIG. 1 is a block diagram showing the configuration of an example of a system for providing a website search engine service.
Figure 2:
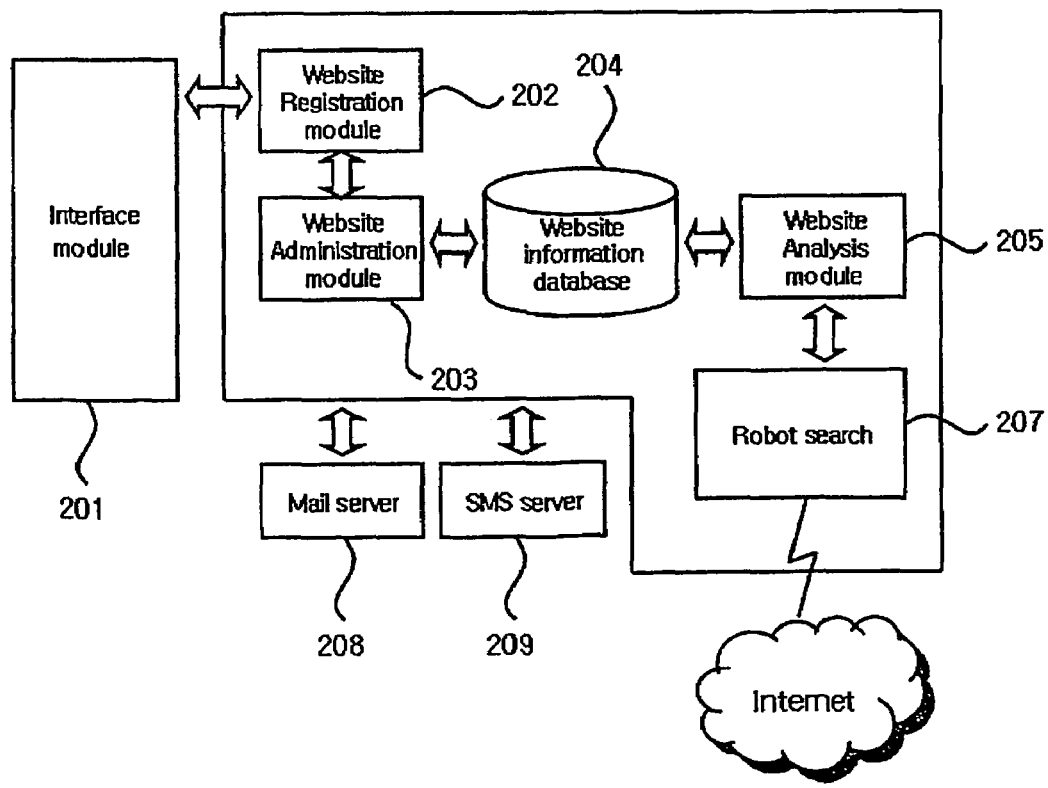
FIG. 2 is a block diagram showing the configuration of a system for managing websites registered in a search engine according to a preferred embodiment of the present invention.

FIG. 2 is a block diagram showing the configuration of a system for managing websites registered in a search engine according to a preferred embodiment of the present invention. Referring to FIG. 2, the system for managing websites registered in a search engine according to a preferred embodiment of the present invention may include an interface module 201, a website registration module 202, a website administration module 203, a website information database 204, a website analysis module 205, and a search robot 207.

The system for managing websites registered in a search engine according to a preferred embodiment of the present invention may further include a mail server 208 or a SMS (Short Message Service) server 209 for transmitting a predetermined message to a registrant of a website. The mail server 208 and the SMS server 209 may be located in a search engine service-providing system or a system operated by a third party. FIG. 2 shows that the interface module 201, various kinds of modules and the mail server 208 or the SMS server 209 look like individual entities. However, it is merely for convenience of explanation and instead they may be the same entity. Furthermore, the components shown in FIG. 2 may be located at the same location physically or may be isolated physically according to another embodiment.

The interface module 201 is responsible for data transmission between a computer terminal provided on the part of a registrant who wants to register a predetermined website in a search engine and a system for managing registration of the search engine, and interface between physical transmission equipment.

The website registration module 202 serves to receive a request for registration of a predetermined website from the registrant, and collects and classifies information data on the website, which are included when the request for registration of the website is made. The website registration module 202 may further include a billing module (not shown) for performing predetermined billing for registration of the website. The billing module may operate to demand different billing according to the type of websites for which registration is requested (depending on a common site containing common content or an adult site containing adult content).

The website administration module 203 is a module that generalizes registration management of a website according to the present invention. The module 203 serves to determine whether a website is properly operated according to a predetermined reference based on information on the website, which is collected by the search robot 207. If it is determined that the website is a website that operates abnormally, i.e., a spam or deteriorated site, the module 203 controls a predetermined measure to be automatically taken against the registrant of the website. Moreover, the website administration module 203 can give a warning to the registrant of the spam or deteriorated site about illegal operation of the website by sending e-mail to the registrant or transmitting SMS to a mobile phone of the registrant in cooperation with the mail server 208 or the SMS server 209.

The website information database 204 serves to classify information on a registered website and has the information written therein. The website information database 204 may have a variety of information such as an URL of a website, a keyword of a corresponding website, registrant information of a corresponding website (a name, an address, an e-mail address, a mobile phone number, etc. of the registrant) and directory information of a corresponding website sorted and recorded therein by field. Information recorded in the website information database 204 according to the present invention can be modified by a system administrator and a registrant of a website. If content of a website is modified, relevant information can be automatically updated as a result of an analysis into data collected by the search robot 207 (a new keyword corresponding to an URL of a corresponding website, etc.) although the relevant information is not modified by the registrant directly.

The website analysis module 205 functions to analyze information on a website that is collected by the search robot 207. The type of data collected by the search robot 207 and the method of analyzing the data will be described below with reference to FIG. 3.

Furthermore, the website analysis module 205 extracts a HTML file of a first page that is the highest page of web pages constituting a website. The website administration module 203 may operate to decide the website as a spam site if the first page is a spam page. In this case, if it is determined that the first page is not a spam page, the website analysis module 205 extracts HTML files of one or more second pages that are lower pages of the first page to analyze the extracted HTML files. The website administration module 203 may determine whether the second pages are spam pages, calculate the total number of second pages and the number of second pages that are designated as spam pages to produce spam page ratio information, and decide that the website is a spam site if the spam page ratio information exceeds a predetermined value.

The method of determining whether a website having one or more web pages is a spam site as such will be described later with reference to FIGS. 7a and 7b.

The respective components constituting the system for managing the website registered in the search engine according to an embodiment of the present invention have been divided functionally for convenience of explanation but have nothing to do with their actual physical locations. Furthermore, it will be evident to those skilled in the art that the aforementioned modules may be implemented using hardware and may be implemented by means of software using specific codes.

<Method for Detecting Spam Pages>

Figure 3A:
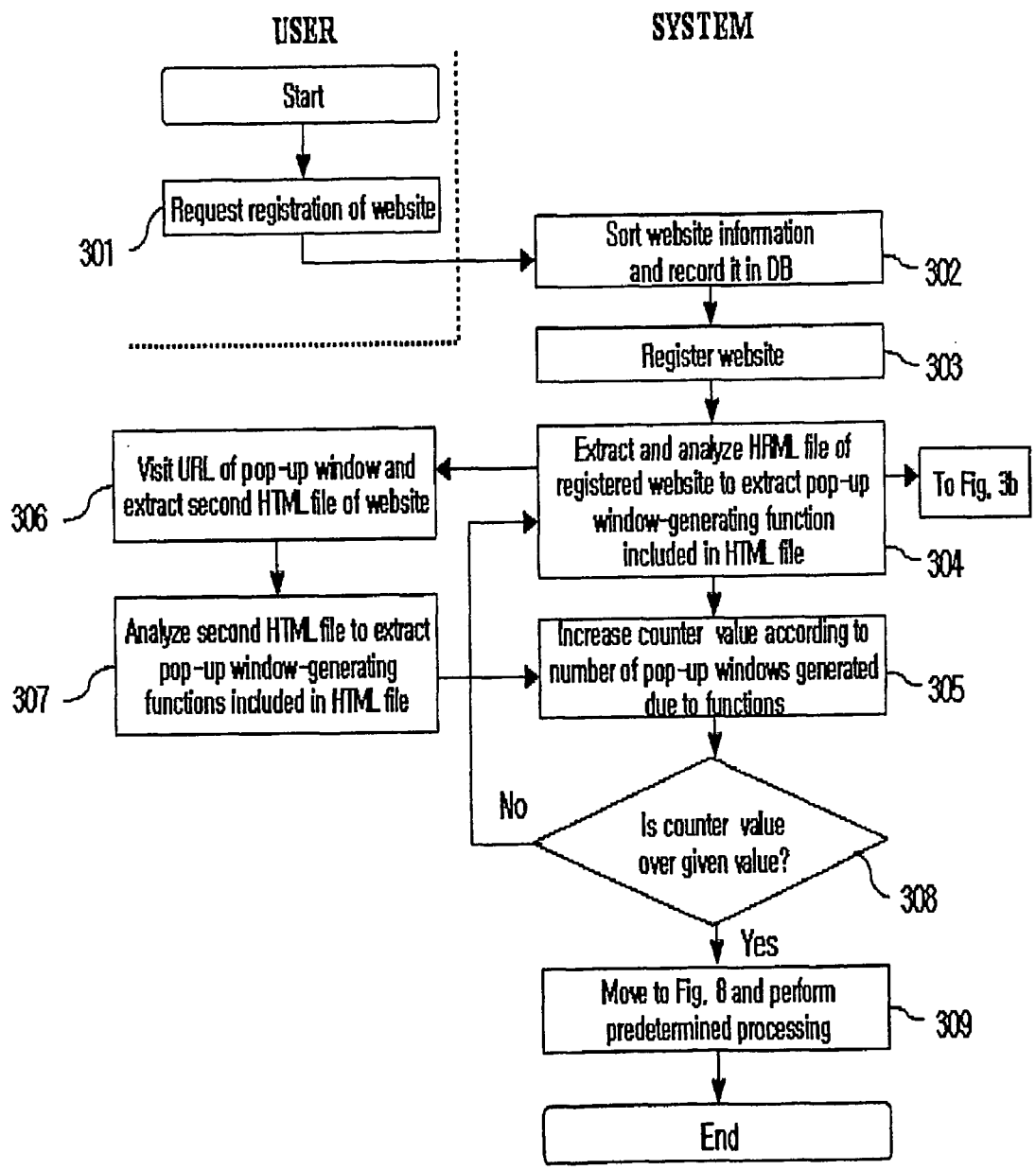
FIGS. 3a and 3b are flowcharts illustrating a method of managing websites registered in a search engine according to an embodiment of the present invention.
Figure 3B:
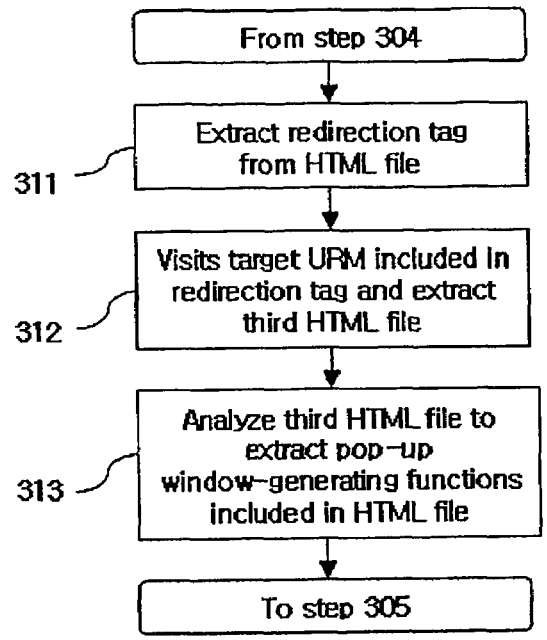

FIGS. 3a and 3b are flowcharts illustrating a method of managing websites registered in a search engine according to a preferred embodiment of the present invention. The method of managing the registered websites shown in FIG. 3 includes detecting a predetermined spam site among registered websites and controlling an operator of a corresponding site to take some measures. The method of managing the websites registered in the search engine shown in FIG. 3 according to a preferred embodiment of the present invention will now be described with reference to FIGS. 4a and 4b, and FIG. 7.

The method of managing websites registered in a search engine shown in FIGS. 3a to 3b according to a preferred embodiment of the present invention is performed as follows. A registrant who wants to register a predetermined website in a search engine requests registration of the website and provides information on the website (step 301). The information on the website is sorted by information field (a name, an address, an e-mail address, a mobile phone number, etc. of a registrant) and is then recorded in a website information database (step 302). The website is then registered in the search engine (step 303). This registration step (step 303) can be performed through several routes. For example, the website can be registered by a website administrator who requests registration of his website in the search engine, as described, or registered in the search engine based on website information obtained by a search robot that randomly travels the web. In case of the former, the registrant of the website directly decides the title of the website (for example, "Picachu," "patent attorney license examination," etc.) and requests registration of the website in a category nearest to the title of the website. If it is determined that the requested website meets a predetermined condition (completeness of the website, non-commercial site requirements if a registration fee is not paid, etc.) through the supervision of an expert surfer, the website can be registered in the search engine. In the method of managing the registration of a website in a search engine according to the present invention, it has been described that a route along which the website is registered in the search engine is defined to a case where the registrant actively requests it. However, the method of managing the registration of a website in a search engine and system thereof according to the present invention can be applied to various kinds of methods in which a website is registered in the search engine in the same manner.

If the website is registered, the search engine controls the search robot to extract a HTML file constituting web pages of the registered website and analyzes the extracted HTML file to extract a function that generates a pop-up window included in the HTML file (step 304).

The analysis method according to an embodiment of the present invention is to extract the pop-up window-generating function by analyzing the HTML file of the website.

FIGS. 4a and 4b show several examples including a function for generating a pop-up window that is included in a HTML file of a website through analysis into the HTML file, which is performed in step 304 of FIG. 3a. Hereinafter, how the HTML file is analyzed in the method of managing websites registered in a search engine according to the present invention will be described with reference to FIGS. 4a and 4b.

FIG. 4a shows an example of a HTML file of a spam site that generates a pop-up window when a user exits a predetermined website. There is shown in FIG. 4a an example of a HTML file expressed into a Java script language as a script language. A "leave( )" function defined in the script serves to generate a pop-up window specified as www.yourserver.com/page-to-open.html when a user exists a website containing the HTML file. Parameters such as "toolbar," "menubar," "location," "height" and "width" within the function are for specifying the size, location, etc. of the generated pop-up window.

FIG. 4b is an example of a HTML file of a spam site that generates a pop-up window when a user visits a predetermined website. In FIG. 4b, there is shown an exemplary HTML file expressed into a Java script language as a script language. A "TripodShowPopup" function defined in the script serves to generate a pop-up window specified as "http://jhkimg.hihome.com/" when a user visits a website containing the HTML file shown in FIG. 4b. Various parameters within the function are for specifying the size, location, etc. of the generated pop-up window.

In addition to the exemplary HTML files shown in FIGS. 4a and 4b, a pop-up window can be generated by means of a variety of methods. In other words, the method of managing the website registered in the search engine according to the present invention can be implemented to extract a HTML file for generating a pop-up window other than the examples shown in FIGS. 4a and 4b, by analyzing HTML files for generating pop-up windows through these various methods.

In step 304, the pop-up window-generating function is extracted and at the same time the method branches to various methods wherein a website that generates a predetermined pop-up window is analyzed according to a preferred embodiment of the present invention.

The method includes analyzing the pop-up window-generating function extracted in step 304 and then visiting a pop-up window URL included in the pop-up window-generating function to extract a HTML file (a second HTML file) of the pop-up window (step 306). The extracted second HTML file is then analyzed to extract a function that generates a pop-up window included in the second HTML file (step 307). As a person having ordinary skill in the art may well know, in view of the attribute of a pop-up window, in the event there exists a pop-up window generated in one website, consecutive pop-up windows are all displayed to a user if other pop-up windows are generated in the HTML file of the pop-up window. Therefore, the sum of the number of pop-up windows generated in a corresponding website and the number of second pop-up windows generated due to the pop-up window become the number of pop-up windows that are displayed to the user. As such, the number of pop-up windows generated due to the HTML file of the corresponding website and the number of pop-up windows generated due to the HTML file of the pop-up window are summed and a predetermined counter value is increased as much as a given value depending on the number of summed pop-up windows (step 305).

The method of managing the website registered in the search engine according to another embodiment of the present invention may include analyzing the HTML file registered in step 304 to extract a redirection tag included in the HTML file and summing even the number of pop-up windows generated by a target URL, which is included in the redirection tag. Step 304 branches to FIG. 3b wherein a redirection tag included in a HTML file of a predetermined website is extracted (step 311). An example of such a redirection tag will be described later with reference to FIG. 6a. The extracted redirection tag is analyzed and the search robot is controlled to extract a third HTML file of a target URL included in the redirection tag (step 312). The extracted third HTML file is analyzed to extract a function that generates a pop-up window, which is included in the third HTML file (step 313), and the process then returns back to step 305 of FIG. 3a.

In step 305, (1) the number of pop-up windows generated in a corresponding website, (2) the number of second pop-up windows generated due to the pop-up window and (3) the number of third pop-up windows generated due to the HTML file of the website specified as the target URL that is moved due to the redirection tag included in the HTML file of the corresponding website are all summed and a counter value is increased by a given value depending on the number of summed pop-up windows.

Figure 3C:
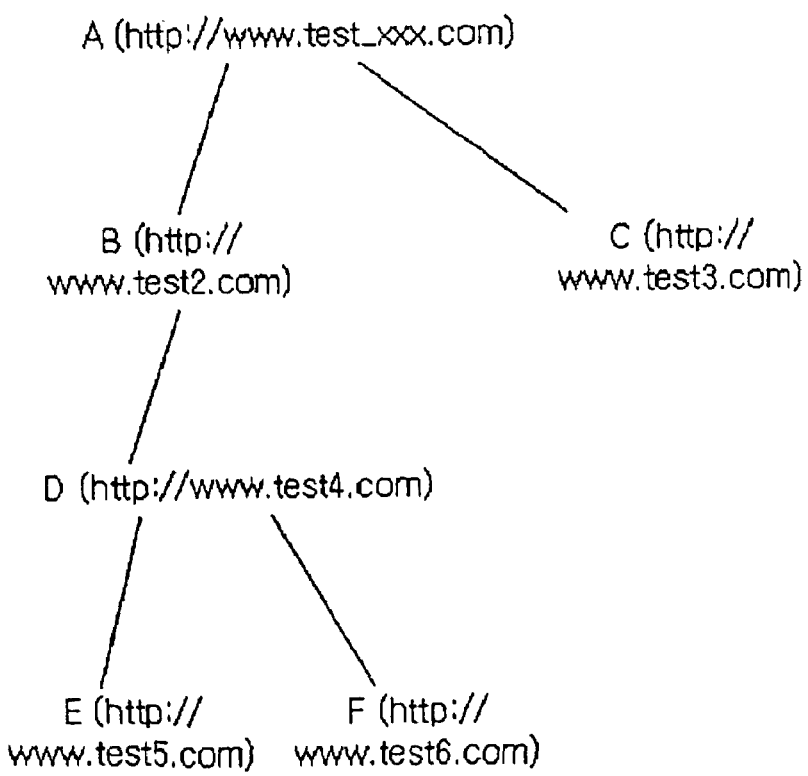
FIG. 3c shows a tree structure of a website URL for measuring the number of pop-up windows generated in the method of managing the website registered in the search engine according to an embodiment of the present invention.

FIG. 3c shows a tree structure of a website URL for measuring the number of pop-up windows that are generated in the method of managing the website registered in the search engine according to an embodiment of the present invention. In FIG. 3c, there is shown exemplary websites B to F connected to predetermined website A (http://www.test_xxx-.com). Website B (http://www.test2.com) that is a pop-up window is included in a HTML file of website A, and website C (http://www.test3.com) that is a target URL of a redirection tag is included in the HTML file of website A. Website D (http://www.test4.com) is connected to website B and website E (http://www.test5.com) that is a target URL of a redirection tag is included in a HTML file of website D. Website F (http://www.test6.com) that is a pop-up window URL of a pop-up window-generating function is included in the HTML file of website D. As shown in FIG. 3c, according to an embodiment of the present invention, it is possible to analyze the HTML files of websites B to F linked to website A and then measure the number of all the pop-up windows that are displayed to a user when the user visits website A.

Figure 8:
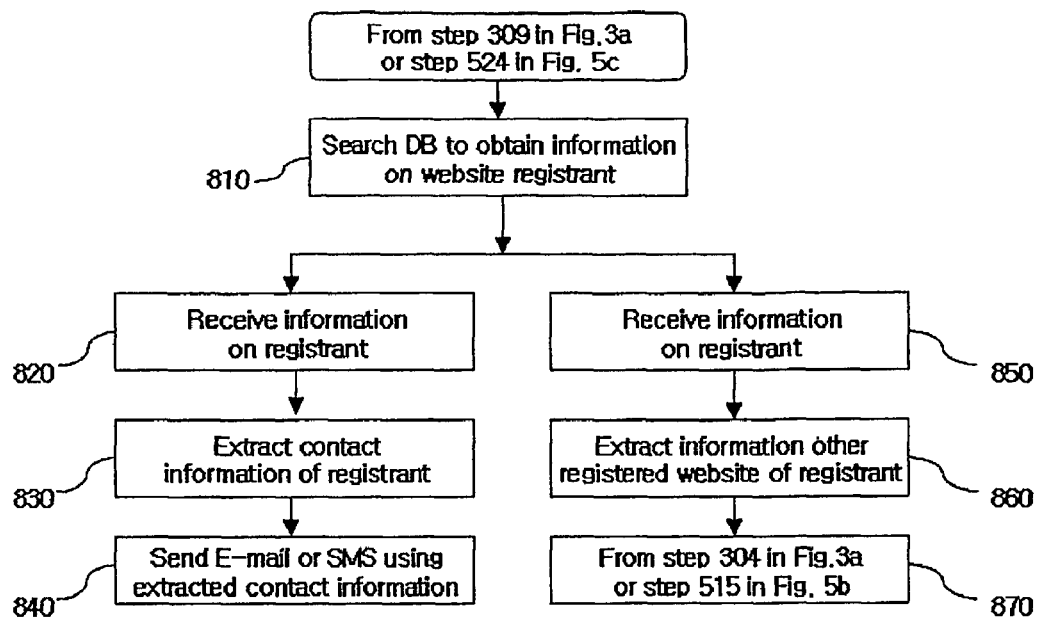
FIG. 8 is a flowchart illustrating a method of applying sanctions against a registrant of a website that is determined to be a spam or adult site in a method of managing websites registered in a search engine according to a preferred embodiment of the present invention.

If the counter value is increased as much as a given value depending on the number of pop-up windows generated in step 305, it is determined whether a corresponding counter value exceeds a given value (step 308). According to a preferred embodiment of the present invention, the given value may be 3. If the counter value exceeds the given value, a corresponding website is decided as a "spam site" that generates a given number of pop-up windows. Predetermined sanctions shown in FIG. 8 are applied against the corresponding website (step 309).

<Method for Detecting Adult Pages>

FIGS. 5a to 5d are flowcharts illustrating a method of detecting a deteriorated page and applying predetermined sanctions against deteriorated pages in order to manage websites registered in a search engine according to another embodiment of the present invention.

Figure 5A:
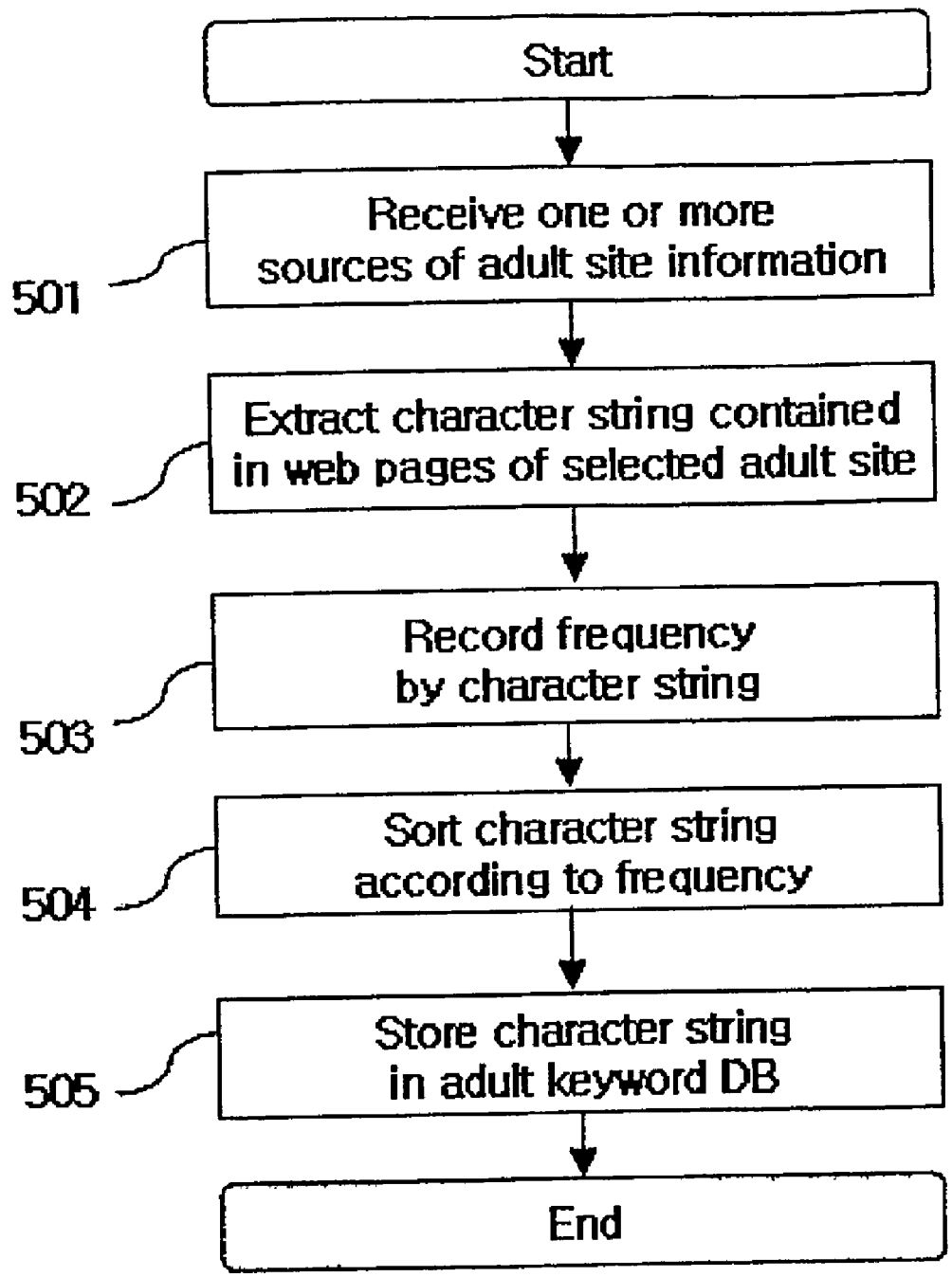
FIGS. 5a to 5d are flowcharts illustrating a method of managing websites registered in a search engine according to another embodiment of the present invention.

FIG. 5a shows an example of a method of constructing a predetermined adult keyword database by selecting an adult keyword.

The method of constructing the adult keyword database by selecting the adult keyword that becomes a basis for determining whether a predetermined website is an adult site may include the following steps. One or more adult sites are first selected (step 501). The adult sites may be selected directly by an administrator of a website registration administration system according to the present invention. Alternatively, at least one of websites, which have been registered as adult sites as a result of searching a predetermined website category information field in a database means of a system according to the present invention, may be automatically selected. Character strings included in web pages of the selected adult site are extracted (step 502). The frequency is recorded by the extracted character string (step 503). In order to record the frequency, a method wherein the extracted character strings are recorded in the form of a table and a field value of the frequency of the table is increased one by one whenever a corresponding character string is extracted. As a result of the analysis, the recorded character strings are sorted every predetermined period (by date, week or month) based on their frequency (step 504). Character strings located at the upper side are extracted, selected as adult keywords, and then recorded in the adult keyword database (step 505). Furthermore, according to another embodiment of the present invention, when adult keywords are selected, all character strings that are detected can be selected as adult keyword without being sorted. In this case, although there is a possibility that a character string that is not an adult keyword can be selected as an adult keyword, there is an effect in that overload of a system necessary for selection of an adult keyword due to sorting can be avoided.

Figure 5B:
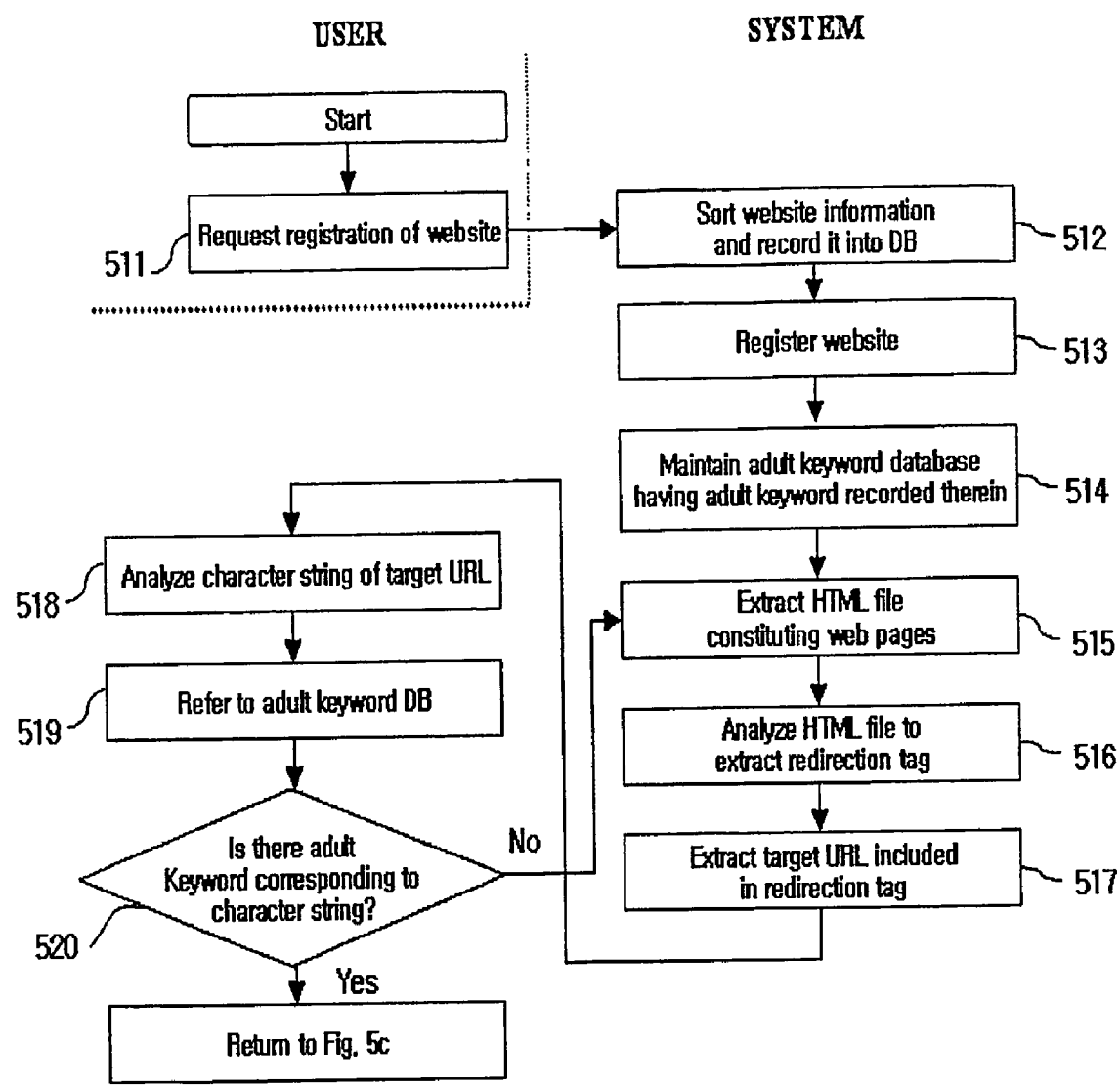
Figure 5C:
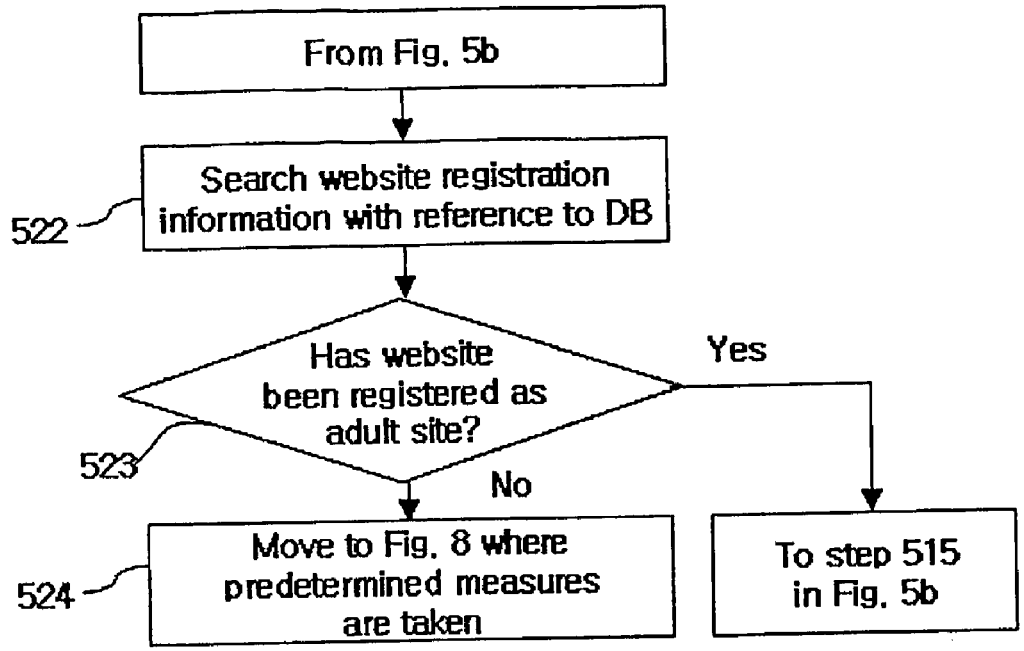
Figure 5D:
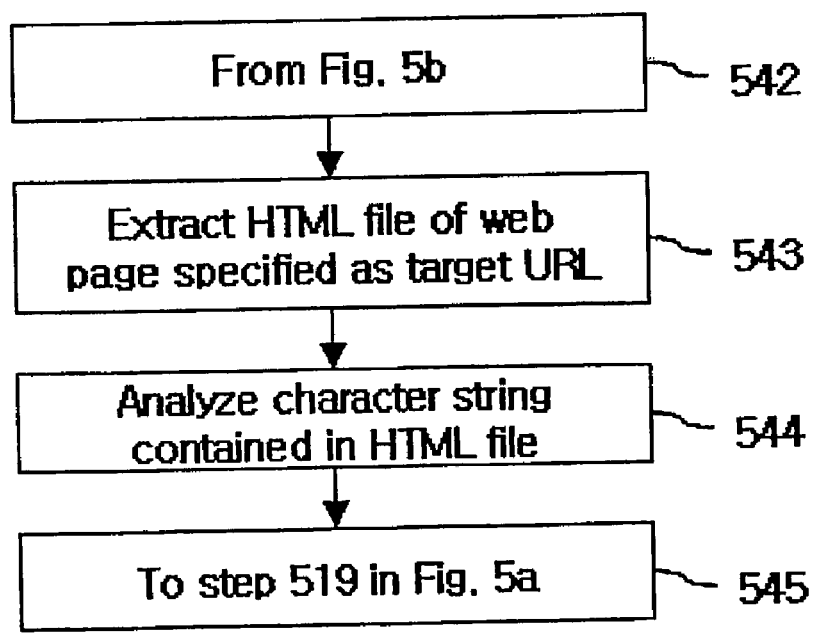

FIGS. 5b and 5c show examples of methods of detecting a predetermined deteriorated site using the adult keyword database constructed by means of the method described with reference to FIG. 5a.

The method of managing websites registered in a search engine according to a preferred embodiment of the present invention shown in FIG. 5b is performed as follows. A registrant who wants to register a predetermined website in a search engine requests registration of a desired website and provides information on the website (step 511). The website information is sorted by information field (a name, an address, an e-mail address, a mobile phone number, etc. of a registrant) and recorded in a website information database (step 512). The website is registered in the search engine (step 513). Step 513 may be the same as step 303 described in FIG. 3a.

Next, an adult keyword database having predetermined adult keywords recorded thereon is maintained (step 514). The adult keyword database can be constructed by means of the method described with reference to FIG. 5a.

If the website is registered, the search engine controls a search robot to extract a HTML file constituting web pages of the registered website (step 515). The extracted HTML file is analyzed to extract a redirection tag included in the HTML file (step 516). Examples of this redirection tag are shown in FIGS. 6a and 6b.

FIGS. 6a and 6b show exemplary HTML files of adult site that are extracted by the search robot that travels websites in the method of managing websites registered in a search engine according to a preferred embodiment of the present invention.

FIG. 6a shows an exemplary HTML file included in a deteriorated site using a character string included the redirection page. As well known to those skilled in the art, this redirection is to set movement from a connected website to a new website. The redirection can be implemented in the form of a HTML file as shown in FIG. 6a. Referring to an example using a meta tag shown at the top of FIG. 6a, a "http-equiv" attribute of the meta tag is used. The meta tag sets automatic movement to another document after a predetermined time (time specified in a content item in FIG. 6a) elapses. The meta tag is usually used to show a change in an address to a user who accesses an old address of a website if the address of the website is changed and allow a user to move to a new address after a predetermined time elapses. The meta tag shown on the top of FIG. 6a operates to redirect a current web page to "http://www.sexhouse.com". Furthermore, in the middle and at the bottom of FIG. 6a, a "self.location" tag and a "location.replace" tag are each used to redirect a current web page to http://www.sexhouse.com.

FIG. 6b shows an example of a HTML file containing such a redirection tag. The HTML file shown in FIG. 6b is a HTML file included in an actual adult site and operates to redirect a current web page to a number of adult sites using the aforementioned meta tag, etc. According to the exemplary HTML file shown in FIG. 6b, the current web page is redirected to adult websites; "http://www.sexhouse.com/rating.html," "http://www.porno.com," "http://www.hardcore.com" and "http://www.pussy.com".

A target URL included in the extracted redirection tag is extracted (step 517). According to a preferred embodiment of the present invention, it is determined whether a website is a deteriorated site by means of the following method based on the target URL extracted in step 517.

A character string included in the extracted target URL itself is first analyzed to determine whether the website is a deteriorated site. In this case, the character string of the extracted target URL is analyzed (step 518). In the exemplary HTML files of the deteriorated sites shown in FIGS. 6a and 6b, the extracted target URL may be "http://www.sexhouse.com," etc. and the character string extracted from the target URL may be "www," "sex," "sexhouse" or the like. In the exemplary HTML files shown in FIGS. 6a and 6b, English letters are written as a character string of the target URL. However, the character string may be Korean characters (Korean domain names) or numerals. Moreover, according to a preferred embodiment of the present invention, the character string may include mother language domain names of all nations to which the method of managing the website registered in the search engine according to the present invention is applied.

Thereafter, it is determined whether the website is a deteriorated site by analyzing the character string of the HTML file included in the website specified by the extracted target URL. In this case, the target URL is extracted in step 517 and a predetermined character string is then extracted by the method shown in FIG. 5d. The search robot is controlled to visit the website specified by the target URL extracted in step 517 and to extract a HTML file included in the website (step 543). The character string included in the extracted HTML file is analyzed (step 544) and the process then returns to step 519 in FIG. 5a.

As described above, after the character string included in the target URL itself or a character string included in the HTML file of the website specified by the target URL is extracted, it is determined whether an adult keyword corresponding to the extracted character string is recorded in the adult keyword database (step 520) by referring to the adult keyword database (step 519). If it is determined that there is an adult keyword corresponding to the character string, the process branches to FIG. 5c. Meanwhile, if there is no adult keyword corresponding to the character string, the process returns back to step 515. According to the method of determining a deteriorated site of the present invention, in order to determine whether a website is a deteriorated site, a method of analyzing the character string included in the target URL itself may be used, a method of analyzing the character string included in the HTML file of the website specified by the target URL may be employed, or both the methods can be used in a hybrid mode. It is thus possible to determine whether a predetermined website is a deteriorated site.

Referring to FIG. 5c, if there is an adult keyword corresponding to the character string in step 520, in order to determine whether a website that is determined to have the adult keyword included in the character string of the target URL is a deteriorated site, registration information on the website is searched referring to the website information database (step 522). This is because the deteriorated site means that a website registered as a common site upon registration has deteriorated into an adult site after registration, as described above.

It is determined whether the website is registered as an adult site by searching website category information of the website recorded in the website information database means (step 523). If it is determined that the website is not registered as an adult site, the website may be determined to be a deteriorated site.

If it is determined that a corresponding website is a deteriorated site in step 523, the process branches to FIG. 7 (step 514) wherein predetermined measures can be taken against the website. If the corresponding website is not the deteriorated site, the process returns back to step 505 of FIG. 5b.

According to another embodiment of the present invention, the method of managing the website registered in the search engine in the search engine administration system according to the present invention may include defining a corresponding website having one or more lower pages as a spam site if the highest page of the corresponding web page is a spam page in one or more web pages constituting the corresponding website. This is a strategic method of determining a spam site. This may be based on results obtained through statistical approaches in which if the highest page is a spam page, there is a high possibility that a corresponding website will be a spam site. Usually, there is a high possibility that a first screen of a specific website visited by a user through a search engine is the highest page. If this highest page is the spam page, a corresponding website may be defined as a spam site.

Figure 7A:
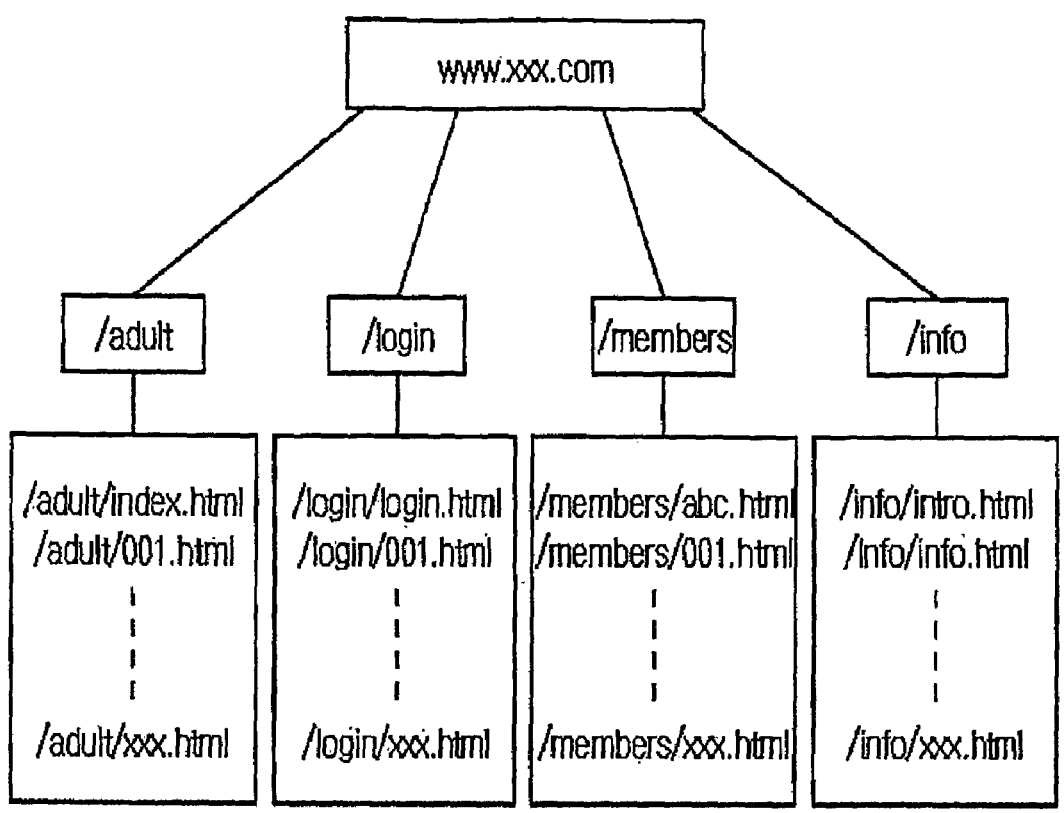
FIG. 7a is a hierarchy view showing the configuration of a web page for explaining a method of determining a specific website as a spam site in case where the website has one or more upper and lower web pages according to an embodiment of the present invention.

FIG. 7a is a configuration hierarchy view of a web page for explaining a method of determining a corresponding website as a spam site when the website has one or more upper and lower web pages according to an embodiment of the present invention.

Referring to FIG. 7a, a specific website (a domain name, "www.xxx.com") is divided into four sub pages. Each of the sub pages has one or more lower web pages. With respect to "www.xxx.com/intro.html" that is the highest page among the web pages, it is determined whether a corresponding web page is a spam page according to the method of detecting the spam page according to the present invention through extraction of a HTML document. In this case, if it is determined that "www.xxx.com/intro.html" which is the highest page is a spam page according to the method of detecting spam pages according to the present invention, the corresponding website (www.xxx.com) may be determined to be a spam site.

Furthermore, according to the present invention, if the highest page is not a spam page but some of lower pages belonging to the highest page are spam pages at a ratio exceeding a predetermined ratio, the corresponding website may be determined to be a spam site. In other words, if some of one or more lower pages constituting "/adult," "/login," "/members," and "/info" which are sub page directories of "www.xxx.com" are spam pages at a ratio exceeding a predetermined ratio, the corresponding website may be determined to be a spam site. For instance, if the ratio is set to 70%, the number of lower pages except for the highest page is 20 in total. If 16 pages are spam pages through analysis by extraction of HTML documents for each of the 20 pages, the ratio is 16/20=0.8. It is therefore possible to determine that the corresponding website is a spam site in which some of lower pages over 70% that is a set ratio are spam pages.

The method of determining spam pages according to the present invention will now be described in detail with reference to the accompanying FIG. 7b.

Figure 7B:
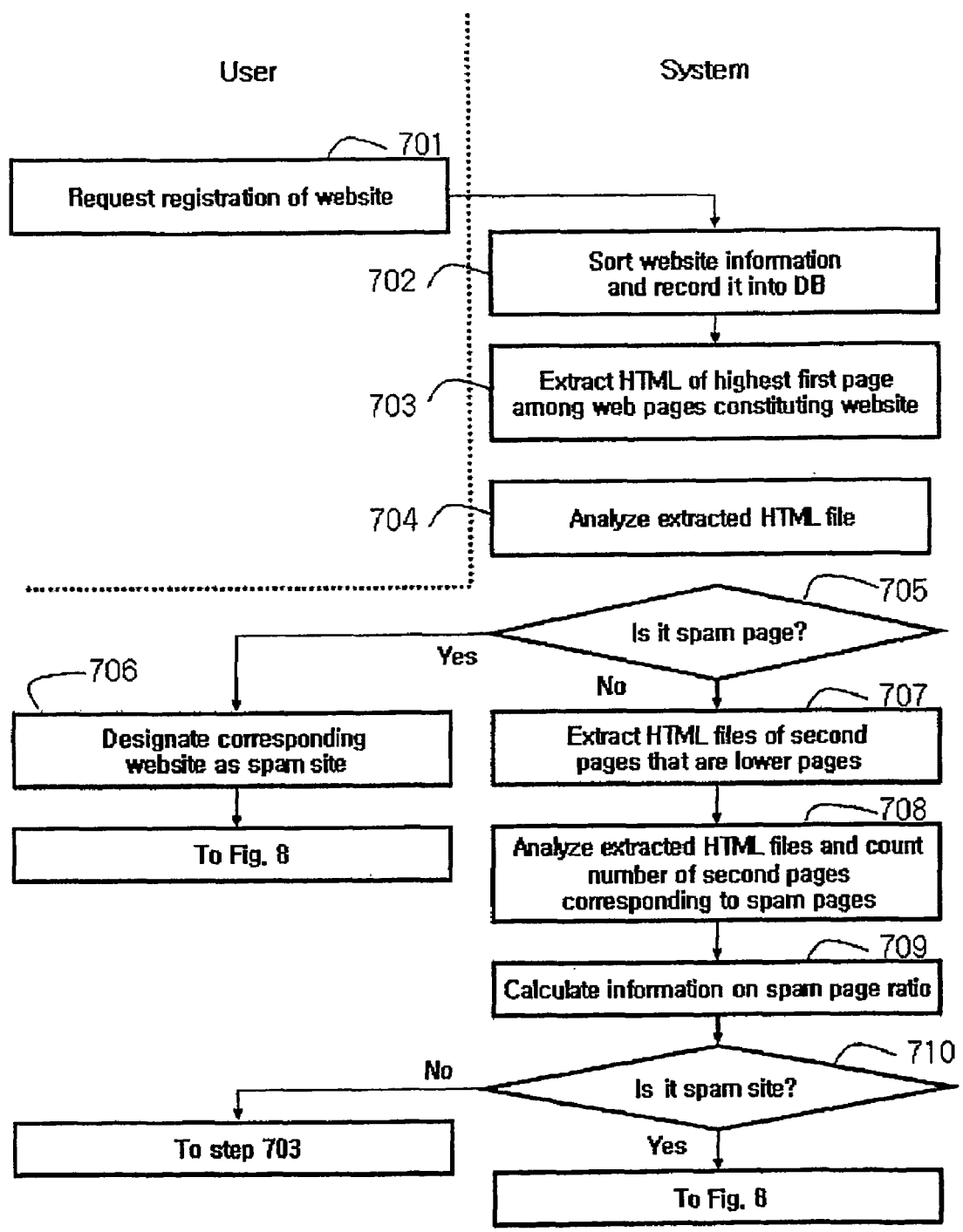
FIG. 7b is a flowchart illustrating an example of a method of determining a website having one or more web pages in the method of managing the registered website according to the present invention.

FIG. 7b is a flowchart illustrating an example of a method of determining a website having one or more web pages in the method of managing websites registered according to the present invention.

Referring to FIG. 7b, the method of determining spam sites according to the present invention can be performed as follows.

As described above, a user registers a desired website in a predetermined search engine (step 701). A registration website administration system according to the present invention has website information on the registered website recorded in a database means by field (step 702). A HTML file of the first page that is the highest page among web pages of the website is extracted (step 703) and the extracted HTML file is analyzed (step 704).

It is determined whether the first page is a spam page by analyzing the extracted HTML file (step 705). The method of determining whether the first page is the spam page in step 705 can employ the method shown in FIGS. 3a and 3b.

If the first page is a spam page in step 705, it is determined that the corresponding website is a spam site (step 706) and branches to FIG. 8 wherein predetermined measures are taken against the corresponding website.

If the first page is not a spam page in step 705, HTML files for one or more second pages that are lower pages of the first page are extracted (step 707). The HTML files of the extracted second pages are analyzed to determine whether these second pages are spam pages. The number of second pages determined to be spam pages is counted (step 708). Information on the ratio of the total number of second pages and the number of second pages determined to be spam pages, which is counted in step 708, is calculated (step 709). It is then determined whether the calculated ratio information exceeds a predetermined value (step 710). If it is determined that the calculated ratio information exceeds the predetermined value, a corresponding website is determined to be a spam site (step 711) and the process branches to FIG. 8 wherein predetermined measures are taken against the corresponding website.

If the calculated ratio information is smaller than the predetermined value in step 710, a corresponding routine branches to step 703 wherein a corresponding operation is repeated.

Through the above method, it is possible to determine whether a website having one or more web pages is a spam site.

<Sanctions against Spam Sites or Deteriorated Sites>

FIG. 8 is a flowchart illustrating a method of applying predetermined sanctions against a registrant of a website that is determined to be a spam or adult site in the method of managing registration of websites in a search engine according to a preferred embodiment of the present invention.

In FIG. 8, there are shown automatic sanctions if it is determined that a website is a spam site in step 308 of FIG. 3a or if it is determined that a website is a deteriorated site in step 523 of FIG. 5c. If it is determined that a website is a spam or deteriorated site, the website administration module searches the website information database to obtain information on a registrant of a corresponding website (step 810). The website administration module receives the information on the registrant (step 820 and 850). According to an embodiment of the present invention, the website administration module operates to extract contact information such as an e-mail address and a mobile phone number of the registrant from the registrant information (step 830) and control the mail server or the SMS server to transmit a predetermined message to the contact information (step 840).

According to further another embodiment of the present invention, the website administration module extracts other registered website information of the registrant from the registrant information (step 860) and controls analysis into other websites registered in the name of the same registrant to be automatically performed (step 870). In case of websites having the same registrant name, there is a high possibility that they may be operated as a spam or deteriorated site in the same or similar method. In this embodiment, if it is determined that a website is a spam or deteriorated site, step 810 of FIG. 8 may be repeated.

According to a preferred embodiment of the present invention, if a predetermined website is determined to be a spam or deteriorated site by means of the aforementioned analysis and determination method, a registrant of the website is automatically informed of a problem of the website by sending e-mail, SMS, etc. and is requested to correct the problem with some suspension period. Moreover, after a given suspension period elapses, the analysis and decision process can be automatically performed. Even in this case, if correction is not made, sanctions such as cancellation of registration can be applied. In addition, according to another embodiment of the present invention, it is possible to apply sanctions such as making the registration procedure troublesome when the registrant of such a website tries to register other web pages.

The embodiments of the present invention include a computer-readable medium having a program command for performing an operation implemented by a variety of computers. The computer-readable medium may include a program command, a data file, a data structure and the like independently or in combination. The program command in the medium may be specially designed or constructed for the present invention, or may be known to a person having ordinary skill in computer software arts. Examples of a computer-readable recording medium may include hardware devices that are specially constructed to store and perform program commands, such as magnetic media such as a hard disk, a floppy disk and a magnetic tape, optical media such as CD-ROM and DVD, magneto-optical media such as a floptical disk, ROM, RAM, a flash memory and so on. An example of a program command may include a high-level language code that can be executed by a computer using an interpreter as well as a machine code such as that generated by a compiler.

Figure 9:
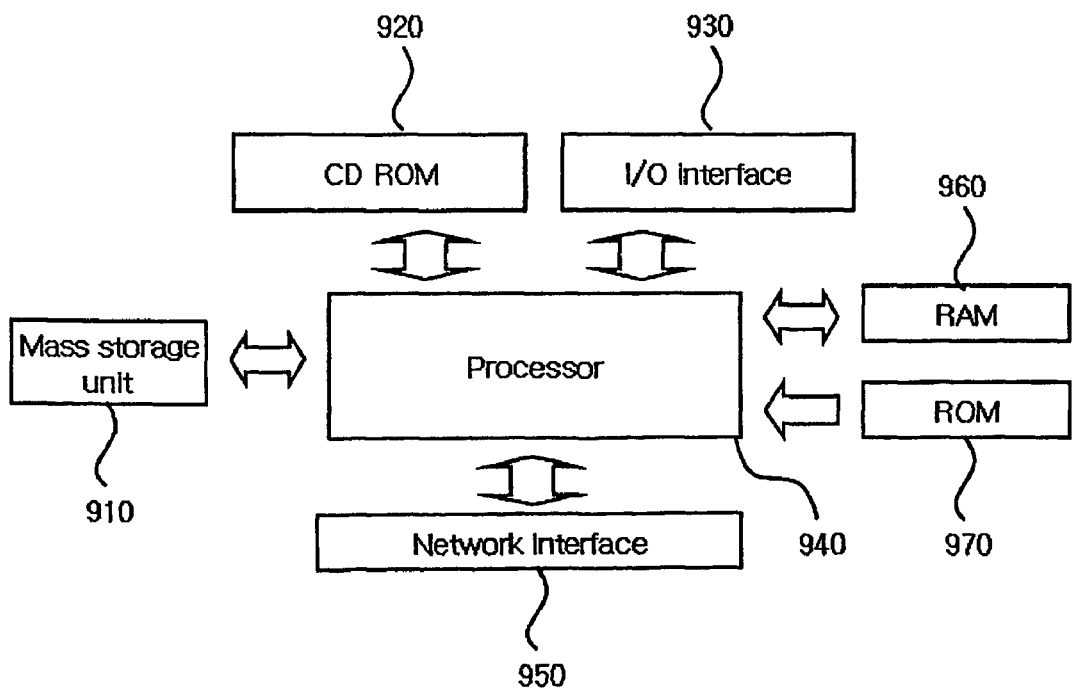
FIG. 9 shows a block diagram showing the inner configuration of a general-purpose computer system that can be adopted in the method of managing websites registered in a search engine according to the present invention.

FIG. 9 shows a block diagram showing the inner configuration of a general-purpose computer system that can be adopted in the method of managing websites registered in a search engine according to the present invention.

The computer system includes any number of processors 940 (also referred to as central processing units, or CPUs) that are coupled to storage devices including primary storage 960 (typically a random access memory, or "RAM"), primary storage 970 (typically a read only memory, or "ROM"). As is well known in the art, primary storage 970 acts to transfer data and instructions uni-directionally to the CPU and primary storage 760 is used typically to transfer data and instructions in a bi-directional manner. Both of these primary storage devices may include any suitable type of the computer-readable media described above. A mass storage device 910 is also coupled bi-directionally to CPU 940 and provides additional data storage capacity and may include any of the computer-readable media described above. The mass storage device 910 may be used to store programs, data and the like and is typically a secondary storage medium such as a hard disk that is slower than primary storage. A specific mass storage device such as a CD-ROM 920 may also pass data uni-directionally to the CPU. Processor 940 is also coupled to an interface 930 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 940 optionally may be coupled to a computer or telecommunications network using a network connection as shown generally at 950. With such a network connection, it is contemplated that the CPU might receive information from the network, or might output information to the network in the course of performing the above-described method steps. The above-described devices and materials will be familiar to those of skill in the computer hardware and software arts.

The hardware elements described above may be configured (usually temporarily) to act as one or more software modules for performing the operations of this invention.

INDUSTRIAL APPLICABILITY

According to a method of managing websites registered in a search engine in accordance with the present invention, a spam site or a deteriorated site that generates a number of pop-up windows can be detected automatically using a predetermined algorithm. Therefore, there is an effect in that a search engine service not causing inconvenience to an engine user can be provided.

Moreover, according to the method of managing the website registered in the search engine in accordance with the present invention, a spam site or a deteriorated site is automatically detected and sanctions are applied against an operator of the detected spam site or deteriorated site. Therefore, there is an effect that self-purification of a registered website itself can be enhanced in a search engine.

Furthermore, according to the method of managing the website registered in the search engine in accordance with the present invention, a spam site or a deteriorated site is detected and sanctions such as giving a warning to the detected spam site or deteriorated site are automatically performed by a predetermined algorithm. Therefore, there is an effect in that a number of human resources consumed in order to detect the above site can be saved.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A method of managing websites registered in a search engine in a search engine administration system, comprising the steps of:

providing a predetermined interface module to receive information on a website and providing a website registration module to sort the received website information by the predetermined field and then to record the sorted information in a database means;

extracting source code from a first HTML file corresponding to a web page of the website;

analyzing the source code extracted from the first HTML file corresponding to the website to detect a predetermined function that generates a first pop-up window;

visiting a URL of a first pop-up window specified by the predetermined function and extracting source code from a second HTML file corresponding to the first pop-up window;

analyzing the source code extracted from the second HTML file corresponding to the first pop-up window to detect the predetermined function that generates a second pop-up window;

increasing a predetermined counter value according to the number of first pop-up windows generated due to the detected function in the source code extracted from the first HTML file and the number of second pop-up windows generated due to the detected function in the source code extracted from the second HTML file;

determining whether the counter value exceeds a predetermined value; and when the counter value is determined to exceed the predetermined value, both controlling a predetermined process to be performed for the registered website and determining the registered website to be a spam site.

2. The method as claimed in claim 1, wherein the predetermined function is one of a function that generates a new pop-up window when a user moves from the website to another website and a function that generates a new pop-up window when the user moves to the website.

3. The method as claimed in claim 2, wherein analyzing the source code extracted from an HTML file to detect the predetermined function that generates a pop-up window comprises the steps of:

detecting a redirection tag included in the HTML file by analyzing the source code extracted from the HTML file;

extracting source code from a third HTML file of a web page constituting a website of a target URL of the detected redirection tag; and detecting the predetermined function that generates a pop-up window by analyzing the source code extracted from the third HTML file.

4. The method as claimed in claim 1, wherein the predetermined value is 3.

5. A method of managing websites registered in a search engine in a search engine administration system, comprising the steps of:

providing a predetermined interface module to receive information on a website and providing a website registration module to sort the received website information by the predetermined field and then to record the sorted information in a database means;

extracting source code from an HTML file of a first page which is the highest page among web pages of the website;

determining whether the first page is a spam page by analyzing the source code extracted from the HTML file of the first page; and when the first page is determined to be a spam page, controlling a predetermined process to be performed for the registered website;

when the first page is determined not to be a spam page:

extracting source code from HTML files of one or more second pages that are lower pages of the first page;

determining whether the second pages are spam pages by analyzing the source code from the HTML files extracted from the second pages;

producing spam page ratio information by calculating both the total number of second pages and the number of second pages determined to be spam pages, wherein the spam page ratio information comprises the number of second pages determined to be spam pages divided by the total number of second pages; and when the spam page ratio information exceeds a predetermined value, controlling the predetermined process to be performed for the registered website, wherein the step of determining whether the first page is a spam page comprises the steps of:

detecting a predetermined function that generates a pop-up window by analyzing the source code extracted from the HTML file; increasing a predetermined counter value according to the number of pop-up windows generated due to the detected function;

determining whether the counter value exceeds a predetermined value; and when the counter value is determined to exceed the predetermined value, determining the registered website to be a spam site.

6. The method as claimed in claim 1, wherein the database means has a website registrant field, and the step of controlling the predetermined process to be performed comprises the steps of:

by searching the website registrant field of the database means, obtaining registrant information of the website and extracting contact information of the registrant from the registrant information of the website; and controlling a predetermined message transmission means to transmit a message to the extracted contact information.

7. The method as claimed in claim 6, wherein the contact information is an e-mail address or a mobile communication terminal number of the website registrant, and the message transmission means is an e-mail server or a SMS server.

8. A computer-readable recording medium useful in association with a computing device which includes a processor and a memory, the computer readable medium including computer instructions which are configured to cause the computing device to implement a method according to claim 1.

9. A system for managing websites registered in a search engine, comprising:

an interface module that performs data communication with one or more terminals;

a registrant making a request for registration of a predetermined website from a first terminal of the one or more terminals;

a website registration module that receives the request by the registrant for registration of the website along with information on the website from the first terminal of the one or more terminals and classifies the website information by the predetermined field, wherein the website information includes registrant information of the website;

a database unit for classifying and storing the website information;

a website analysis module for extracting source code from a first HTML file constituting a first page which is a highest web page among web pages of the website and analyzing the source code extracted from the first HTML file; and a website administration module that determines whether the website is a spam site by analyzing the source code extracted from the first HTML file of the first page to detect a predetermined function that generates a pop-up window, increasing a counter value for the first page according to the number of pop-up windows generated due to the detected predetermined function, determining whether the counter value for the first page exceeds a predetermined value, and when the counter value for the first page is determined to exceed the predetermined value, determining the website to be a spam site;

wherein when the counter value for the first page is determined to not exceed the predetermined value in the website administration module, the website analysis module extracts source code from second HTML files of one or more second pages which are lower pages of the first page and analyzes the source code extracted from the HTML files of the one or more second pages, and the website administration module determines whether the second pages are spam pages, produces a spam page ratio information by calculating the ratio of number of second pages determined to be spam pages and the total number of second pages, and determine the website to be a spam site when the spam page ratio information exceeds a predetermined value; and when the website is determined to be a spam site, the website administration module both extracts the website registrant information by referring to the database unit and controls a predetermined message transmission unit to transmit a predetermined message to the registrant of the website using contact information included in the website registrant information.

10. The method as claimed in claim 5, wherein the database unit has a website registrant field, and the step of controlling the predetermined process to be performed comprises the steps of:

by searching the website registrant field of the database unit, obtaining registrant information of the website and extracting contact information of the registrant from the registrant information of the website; and controlling a predetermined message transmission unit to transmit a message to the extracted contact information.

11. The method as claimed in claim 10, wherein the contact information is an e-mail address or a mobile communication terminal number of the website registrant, and the message transmission unit is an e-mail server or a SMS server.

12. The method as claimed in claim 1, wherein the determining whether the registered website is a spam site occurs when a user of the search engine visits the registered website.

13. The method as claimed in claim 5, wherein the determining whether the registered website is a spam site occurs when a user of the search engine visits the registered website.

14. The method as claimed in claim 9, wherein the determining whether the website is a spam site occurs when a user of the search engine visits the registered website.

* * * * *

UNITED STATES PATENT AND TRADEMARK OFFICE
CERTIFICATE OF CORRECTION

| | | |
|---|---|---|
| PATENT NO. | : 7,664,732 B2 | Page 1 of 1 |
| APPLICATION NO. | : 10/555520 | |
| DATED | : February 16, 2010 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,664,732 B2 |
| APPLICATION NO. | : 10/555520 |
| DATED | : February 16, 2010 |
| INVENTOR(S) | : Young Kwan Kim et al. |

It is certified that error appears in the above-identified patent and that said Letters Patent is hereby corrected as shown below:

In the drawings, Sheet 3, FIG. 3b, step 312, "URM" should be changed to --URL--;
In the drawings, Sheet 7, FIG. 5d, step 545, "Fig. 5a" should be changed to --Fig. 5b--;
In the drawings, Sheet 10, FIG. 7b, reference numeral --711-- should be applied to the step "To Fig. 8".
Column 10, line 61, delete "519 in FIG. 5a" and insert therefor --519 in FIG. 5b--.
Column 11, lines 31-32, delete "Fig. 7 (step 514)" and insert therefor --step 524 (move to Fig. 8)--;
Column 11, line 34, delete "505" and insert therefor --515--.

Signed and Sealed this
Twenty-fifth Day of January, 2011

David J. Kappos
*Director of the United States Patent and Trademark Office*